(12) United States Patent
Hanson et al.

(10) Patent No.: US 10,519,810 B2
(45) Date of Patent: Dec. 31, 2019

(54) MANIPULATION OF TURBOMACHINE COMBUSTORS

(71) Applicant: General Electric Company, Schenectady, NY (US)

(72) Inventors: Stuart Craig Hanson, Fair Play, SC (US); Kyle Joseph Banwart, West Bend, IA (US); Joseph Daniel Becker, Travelers Rest, SC (US); Jereld Alen Meiers, Piney Flats, TN (US); Thomas Michael Merlau, Greenville, SC (US)

(73) Assignee: General Electric Company, Schenectady, NY (US)

( * ) Notice: Subject to any disclaimer, the term of this patent is extended or adjusted under 35 U.S.C. 154(b) by 502 days.

(21) Appl. No.: 15/258,552

(22) Filed: Sep. 7, 2016

(65) Prior Publication Data

US 2016/0376926 A1    Dec. 29, 2016

Related U.S. Application Data

(63) Continuation-in-part of application No. 14/088,720, filed on Nov. 25, 2013, now Pat. No. 9,486,899.

(51) Int. Cl.
*B23P 19/04* (2006.01)
*F01D 25/28* (2006.01)
(Continued)

(52) U.S. Cl.
CPC .......... *F01D 25/285* (2013.01); *B23P 19/042* (2013.01); *B25H 1/0007* (2013.01);
(Continued)

(58) Field of Classification Search
CPC ...... B23P 19/042; F01D 25/28; F01D 25/285; F05D 2260/02; F05D 2260/30;
(Continued)

(56) References Cited

U.S. PATENT DOCUMENTS 2,994,443 A    8/1961    Gordon
3,235,097 A    2/1966    Öhman
(Continued)

FOREIGN PATENT DOCUMENTS

EP    2070663 A1    6/2009
EP    2990615 A1 *  3/2016    ........... F01D 25/285
(Continued)

OTHER PUBLICATIONS

Machine Translation of EP 2 990 615, http://translationportal.epo.org/emtp/translate/?ACTION=description-retrieval&COUNTRY=EP&ENGINE=google&FORMAT=docdb&KIND=A1&LOCALE=en_EP&NUMBER=2990615&OPS=ops.epo.org/3.2&SRCLANG=de&TRGLANG=en; May 13, 2019 (Year: 2019).*

(Continued)

*Primary Examiner* — Ryan D Kwiecinski
(74) *Attorney, Agent, or Firm* — Theo Stamatiadis; Hoffman Warnick LLC (57) ABSTRACT

Embodiments of the present disclosure relate to the manipulation of turbomachine combustors. An apparatus according to the present disclosure can include: a bracket body including an operative head configured to removably attach a turbomachine combustor; a rotatable joint rotatably coupled to the bracket body through a gear bearing, wherein the gear bearing is configured to rotate the bracket body relative to the rotatable joint; and a suspended member rotatably coupled to the rotatable joint at a first end, and coupled to a suspension joint at a second end, wherein the rotatable joint rotates the gear bearing and the bracket body relative to the suspended member to center the gear bearing about a predetermined axis of rotation.

19 Claims, 10 Drawing Sheets

(51) Int. Cl.

| | | |
|---|---|---|
| *F16M 11/10* | (2006.01) | |
| *B25H 1/00* | (2006.01) | |
| *F02C 7/20* | (2006.01) | |
| *F16M 11/24* | (2006.01) | |
| *B25H 1/10* | (2006.01) | |
| *F16M 11/20* | (2006.01) | |
| *F16M 11/38* | (2006.01) | |
| *F16M 11/04* | (2006.01) | |
| *B64F 5/10* | (2017.01) | |
| *B25H 1/02* | (2006.01) | |
| *F16M 11/14* | (2006.01) | |
| *F16M 11/18* | (2006.01) | |
| *F16M 11/08* | (2006.01) | |
| *B64D 27/26* | (2006.01) | |

(52) U.S. Cl.
CPC .............. *B25H 1/0042* (2013.01); *B25H 1/02* (2013.01); *B25H 1/10* (2013.01); *B64F 5/10* (2017.01); *F02C 7/20* (2013.01); *F16M 11/048* (2013.01); *F16M 11/08* (2013.01); *F16M 11/10* (2013.01); *F16M 11/14* (2013.01); *F16M 11/18* (2013.01); *F16M 11/2021* (2013.01); *F16M 11/2085* (2013.01); *F16M 11/24* (2013.01); *F16M 11/38* (2013.01); *B64D 2027/266* (2013.01); *F05D 2240/35* (2013.01); *F05D 2260/02* (2013.01); *F05D 2260/30* (2013.01); *F16M 2200/061* (2013.01)

(58) Field of Classification Search
CPC .... F16M 11/046; F16M 11/125; F16M 11/38; F16M 11/2021; F16M 11/10; A47B 2009/003; A47B 57/26; A47B 57/265; A47B 87/0223; B25H 1/007; B64D 27/26; B64D 2027/266; B64D 2027/264; B64D 2027/262; F02C 7/20
USPC ......... 248/371, 398, 420, 421, 178.1, 185.1, 248/554, 555, 556, 557
See application file for complete search history.

(56) References Cited

U.S. PATENT DOCUMENTS

| | | | |
|---|---|---|---|
| 4,069,922 A | | 1/1978 | Hawkins |
| 4,559,985 A | * | 12/1985 | May .......................... B27L 7/00 |
| | | | 144/195.1 |
| 4,571,820 A | | 2/1986 | Matsumoto et al. |
| 5,440,943 A | * | 8/1995 | Holt .................. B25J 9/1694 |
| | | | 248/277.1 |
| 5,486,084 A | | 1/1996 | Pitman et al. |
| 5,575,607 A | * | 11/1996 | Grout .................... B66C 19/00 |
| | | | 212/344 |
| 5,725,112 A | | 3/1998 | Thorby |
| 5,810,547 A | * | 9/1998 | Bruno .................. B60P 1/5433 |
| | | | 212/180 |
| 5,911,680 A | | 6/1999 | Takeoka |
| 6,305,678 B1 | * | 10/2001 | Hammersmith ..... B23K 37/047 |
| | | | 269/71 |
| 6,371,685 B1 | | 4/2002 | Weems et al. |
| 6,679,144 B2 | | 1/2004 | Yeo et al. |
| 8,413,539 B2 | | 4/2013 | Chenu |
| 8,469,209 B2 | | 6/2013 | Holmes et al. |
| 8,713,775 B2 | | 5/2014 | Zhang et al. |
| 9,255,522 B2 | | 2/2016 | Sancewich et al. |
| 9,377,067 B2 | * | 6/2016 | Mellberg ................ B23P 19/04 |
| 9,486,899 B2 | | 11/2016 | Mogle, II et al. |
| 2005/0023015 A1 | * | 2/2005 | Argento ................ B25D 17/28 |
| | | | 173/36 |
| 2012/0049035 A1 | * | 3/2012 | Black .................... F16M 11/10 |
| | | | 248/425 |
| 2012/0124833 A1 | | 5/2012 | Arendt et al. |
| 2014/0201962 A1 | | 7/2014 | Heath |
| 2015/0336222 A1 | | 11/2015 | Aratori et al. |
| 2015/0361894 A1 | | 12/2015 | Murphy et al. |
| 2016/0025065 A1 | | 1/2016 | Eddy et al. |
| 2017/0030092 A1 | | 2/2017 | Young |
| 2017/0051240 A1 | | 2/2017 | Husemann et al. |

FOREIGN PATENT DOCUMENTS

| | | |
|---|---|---|
| EP | 3051077 A1 | 8/2016 |
| GB | 2 306 155 A | 4/1997 |
| JP | 2000-107949 A | 4/2000 |

OTHER PUBLICATIONS

Extended European Search Report and Opinion issued in connection with corresponding EP Application No. 17189510.5 dated Mar. 7, 2018.
U.S. Appl. No. 15/258,558., Notice of Allowance, dated Sep. 27, 2017 , 8 pages.
U.S. Appl. No. 15/258,558.,U.S. Office Action, dated Mar. 28, 2017, 12 pages.

\* cited by examiner

MANIPULATION OF TURBOMACHINE COMBUSTORS

CROSS-REFERENCE TO RELATED APPLICATIONS

This application is a continuation in-part of currently pending U.S. patent application Ser. No. 14/088,720 filed on Nov. 25, 2013. The application identified above is incorporated herein by reference in its entirety for all that it contains in order to provide continuity of disclosure.

BACKGROUND

Embodiments of the present disclosure relate generally to apparatuses and methods for manipulating turbomachine combustors. Turbomachines (e.g., gas turbines) may include combustor units, also known as "combustors." Combustors are chambers which typically receive high pressure air from a compression system of a gas turbine. In the combustor, fuel is introduced and ignited to significantly heat the air. The hot gases are then directed into the first stage nozzle and turbine, where power can be extracted. Stationary power generation gas turbines have become larger and more efficient as technologies and materials have improved. Larger power generation needs and the drive for ever improving efficiency has led to the development of larger and more complex gas turbines. In turn, turbine components such as compressors, combustors and turbine casings have become larger and more complex. Given the large capital cost of these components, it is crucial to handle them safely and efficiently without causing damage. Combustion system complexity is driven by the need to meet stringent exhaust emissions requirements, which impose additional component hardware constraints (multiple fuel manifolds, multiple nozzles, high pressure seals, air shields etc.) that make handling difficult, and damage prevention imperative.

Figure 1:
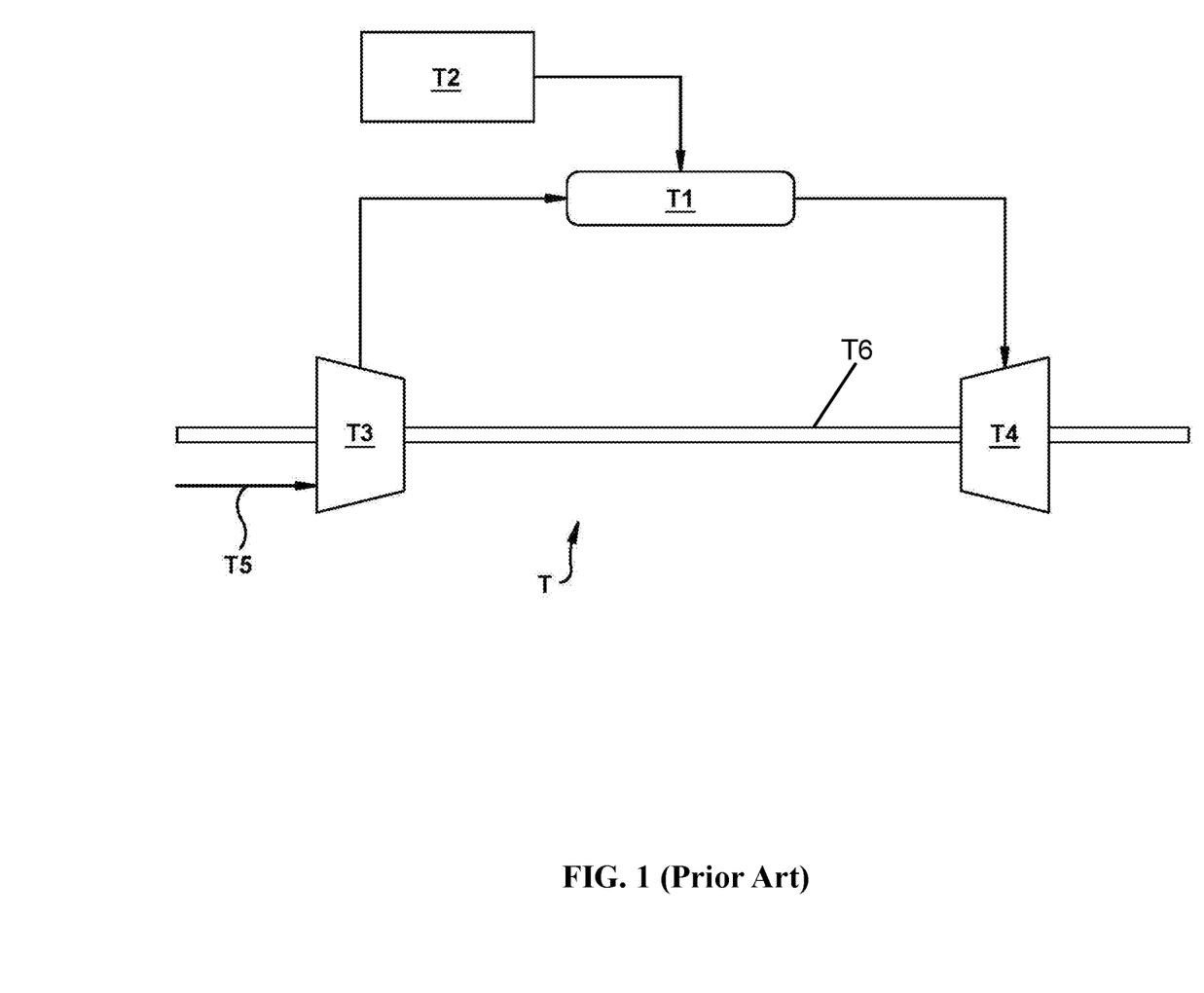
FIG. 1 is a schematic view of a conventional turbine assembly.

FIG. 1 shows a schematic view of a conventional gas turbine assembly T. A gas turbine is a type of internal combustion engine in which compressed air is reacted with a fuel source to generate a stream of hot air. The hot air enters a turbine section and flows against several turbine blades to impart work against a rotatable shaft. The shaft can rotate in response to the stream of hot air, thereby creating mechanical energy for powering one or more loads (e.g., compressors and/or generators) coupled to the shaft. Combustors T1, connected to fuel nozzles T2, are typically located between compressor T3 and turbine T4 sections of gas turbine assembly T. Fuel nozzles T2 can introduce fuel into combustor T1 which reacts with compressed air yielded from compressor T3. Air T5 flows sequentially through compressor T3, combustor T1, and lastly through turbine T4. Work imparted to rotatable shaft T6 can, in part, drive compressor T3. Other forms of turbomachinery besides gas turbines (e.g., gas turbine assembly T) may feature a similar arrangement of components. Manually installing and removing combustors as an alternative to using a conventional crane or mechanical device may not be possible where the combustors being manipulated are very heavy or large (e.g., combustor T1 of a complex gas turbine combustor).

SUMMARY

At least one embodiment of the present disclosure is described herein with reference to the positioning of equipment, such as gas turbine combustors. However, it should be apparent to those skilled in the art and guided by the teachings herein that embodiments of the present disclosure are applicable to any scenario involving manipulation for installation or removal at sites which are inaccessible to conventional overhead (top-down oriented) apparatuses and systems.

A first aspect of the present disclosure provides a method for manipulating a turbomachine combustor configured for installation at a combustor attachment point of a turbomachine casing, the method including: suspending a rotatable joint from a suspended member, such that the suspended member is mechanically coupled to a suspension joint positioned above the combustor attachment point, wherein the rotatable joint is rotatably coupled to a bracket body through a gear bearing, the bracket body being configured to removably attach the turbomachine combustor at an operative head thereof; rotating the rotatable joint relative to the suspended member such that the gear bearing is centered about a predetermined axis of rotation; rotating the bracket body about the predetermined axis of rotation, through the gear bearing, such that the operative head of the bracket body is substantially aligned with the combustor attachment point of the turbomachine casing; contacting the combustor attachment point with the operative head of the bracket body, without contacting the turbomachine casing with the suspended member; and coupling the turbomachine combustor to one of the operative head of the bracket body or the combustor attachment point of the turbomachine casing.

A second aspect of the present disclosure provides an apparatus for installing and manipulating a turbomachine combustor configured for installation in a turbomachine casing, the apparatus including: a bracket body including an operative head configured to removably attach a turbomachine combustor; a rotatable joint rotatably coupled to the bracket body through a gear bearing, wherein the gear bearing is configured to rotate the bracket body relative to the rotatable joint; and a suspended member rotatably coupled to the rotatable joint at a first end, and coupled to a suspension joint at a second end, wherein the rotatable joint rotates the gear bearing and the bracket body relative to the suspended member to center the gear bearing about a predetermined axis of rotation.

A third aspect of the present disclosure provides an apparatus for manipulating a turbomachine combustor configured for use with a turbomachine casing, the apparatus including: a bracket body including an operative head configured to removably attach a turbomachine combustor, wherein the operative head is shaped to engage a complementary surface of the turbomachine combustor; a rotatable joint rotatably coupled to the bracket body through a gear bearing, wherein the gear bearing is configured to rotate the bracket body relative to the rotatable joint; and a suspended member rotatably coupled to the rotatable joint at a first end, and coupled to a suspension joint at a second end, the suspension joint being positioned above the turbomachine casing, wherein the rotatable joint rotates the gear bearing and the bracket body relative to the suspended member to center the gear bearing about a predetermined axis of rotation, and wherein an axis extending from the suspension joint to the operative head of the rotatable bracket defines a center of gravity of the assembly.

BRIEF DESCRIPTION OF THE DRAWINGS

These and other features of the disclosed apparatus will be more readily understood from the following detailed description of the various aspects of the apparatus taken in conjunction with the accompanying drawings that depict various embodiments of the disclosure, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

When an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 2:
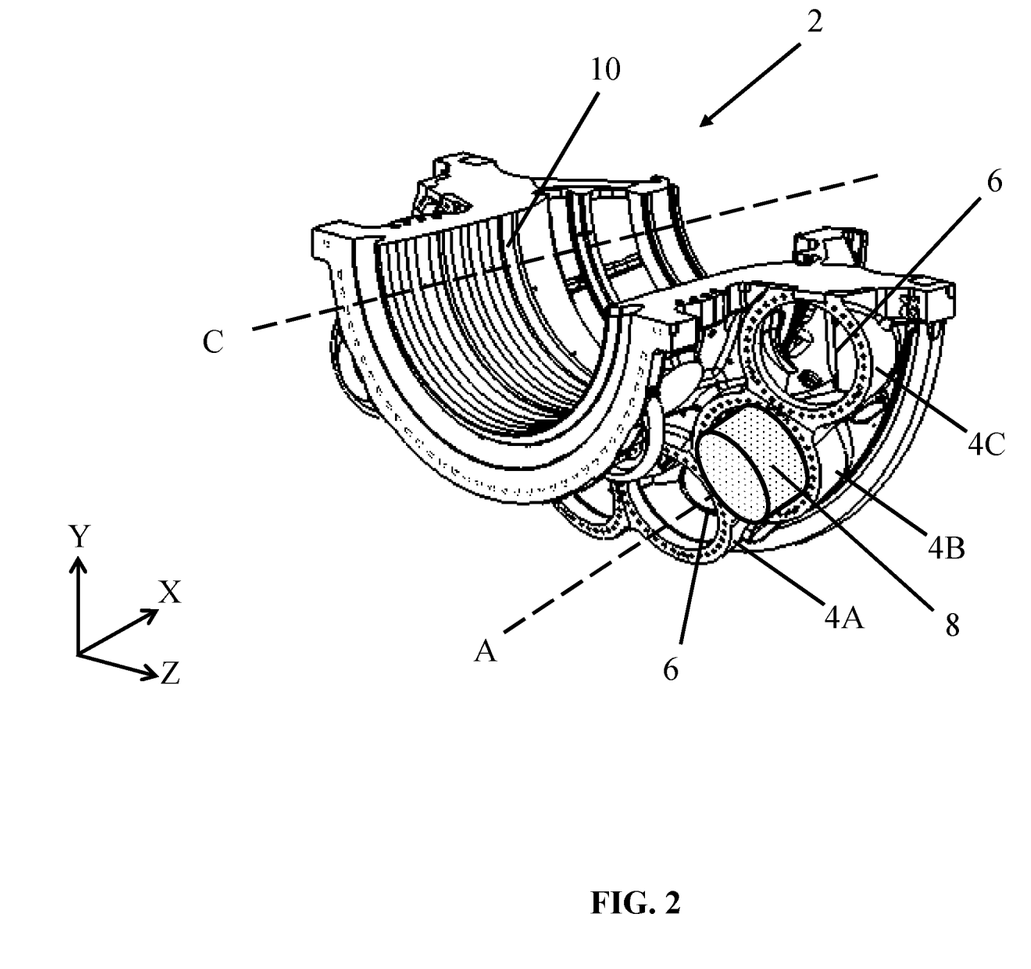
FIG. 2 is a perspective view of a turbomachine casing with turbomachine combustors oriented at a non-parallel angle relative to a centerline axis of the turbomachine casing.

Embodiments of the present disclosure include apparatuses and methods for manipulating turbomachine combustors. In FIG. 2, a partial perspective view of a turbomachine casing ("casing") 2 according to an embodiment of the disclosure is shown. Casing 2 can include a group of combustor attachment points 4A, 4B, 4C positioned circumferentially about a centerline axis C of casing 2. Each of the various combustor attachment points 4A, 4B, 4C can include a hollow interior 6 shaped to receive a turbomachine combustor ("combustor") 8 therein. Each combustor attachment point 4A, 4B, 4C can be oriented such that a centerline axis of hollow interior 6 and combustors 8 installed therein is coincident with a combustor centerline axis A which is non-parallel relative to centerline axis C of casing 2. Each combustor attachment point 4A, 4B, 4C can also be positioned circumferentially about a flow path 10 for operative fluids, which may extend at least partially along centerline axis C. The various combustor attachment points 4A, 4B, 4C as well as flow path 10 may be elevated relative to a surface (not shown) upon which casing 2 rests. Due to the relative position of flow path 10 and combustor attachment points 4A, 4B, 4C, installing and removing turbomachine combustors 8 in casing 2 may be difficult or impossible with conventional overhead devices, such as cranes, which may be designed to extend downward in only one direction (e.g., along axis Y). In particular, the position of flow path 10 in casing 2 may prevent conventional cranes or servicing tools from directly accessing equipment fixture points 4A, 4B, 4C positioned partially or directly beneath flow path 10.

Though apparatuses and methods of the present disclosure are described herein with reference to casing 2, it is understood that the present disclosure may also be applicable to other situations involving, for example, large combustors or similarly designed modular pieces of equipment which are difficult or impossible to access with overhead positioning equipment, e.g., cranes. The apparatuses and methods described herein can be adjusted to extend in the direction of combustor axis A to removably attach combustors 8 at one or more combustor attachment point(s) 4A, 4B, 4C (e.g., an upwards, angular direction) such that servicing tools may be substantially aligned with combustor attachment point(s) 4A, 4B, 4C without contacting or otherwise being obstructed by the outer surface of flow path 10, as discussed herein. In FIGS. 2-7, an example set of axes X, Y, and Z are provided for the sake of clarity and demonstration. Various types of movement relative to each axis X, Y, and Z are discussed to illustrate the various types of movement provided herein. However, it is further understood that embodiments of the present disclosure can include reorienting any given reference axis to thereby adapt to various situations and design needs.

Figure 3:
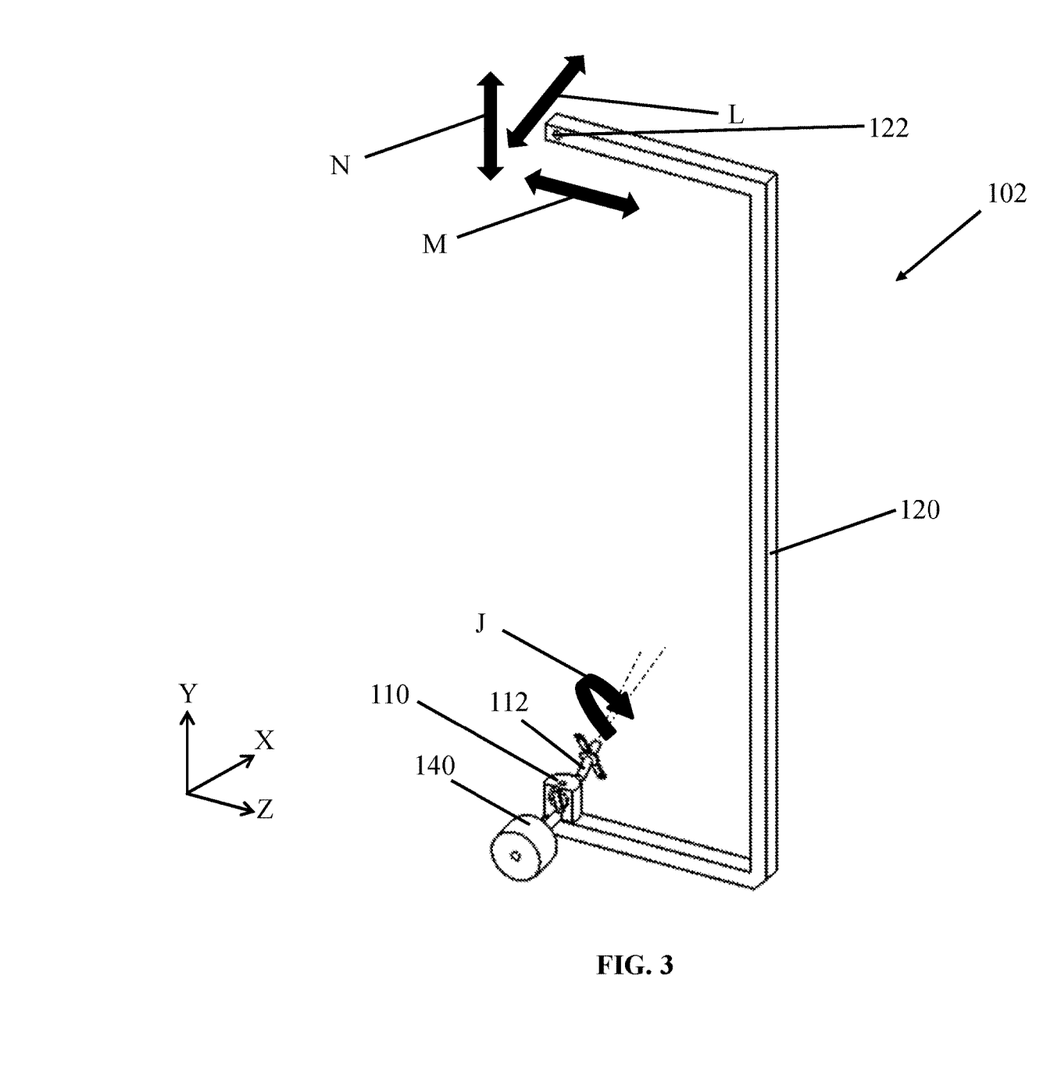
FIG. 3 is a perspective view of a suspended bracket member according to an embodiment of the present disclosure.

Turning to FIG. 3, an apparatus 102 for installing and removing turbomachine combustors 8 (FIG. 2) for casing 2 (FIG. 2) is shown. A bracket 110 with a rotatable member 112 can be coupled to a terminus of a suspended bracket member 120. An overhead device may be coupled to suspended bracket member 120 at support terminus 122 via a crane or hoist (not shown). Suspended bracket member 120 may have any geometry configured to extend circumferentially about flow path 10 (FIG. 2) of turbine casing 2 (FIG. 2) or any similarly large structure. For example, suspended bracket member 120 can be in the form of a linear member, a composite of multiple connected linear members extending in respective directions, one or more curvilinear members, a "C-hook," a "J-hook," and/or another structural assembly capable of extending about the surface of a larger structure, such as turbine casing 2. The coupling of suspended bracket member 120 at support terminus 122 can permit a user to move suspended bracket member 120 in three dimensions, shown by example in FIG. 3 along arrows L, M, and N. As described herein, suspended bracket member 120 can be structured such that suspended bracket member extends non-linearly between support terminus 122 and bracket 110 to wrap around a larger structure or casing, such as turbine casing 2 (FIG. 2) as shown and discussed elsewhere herein.

Figure 4:
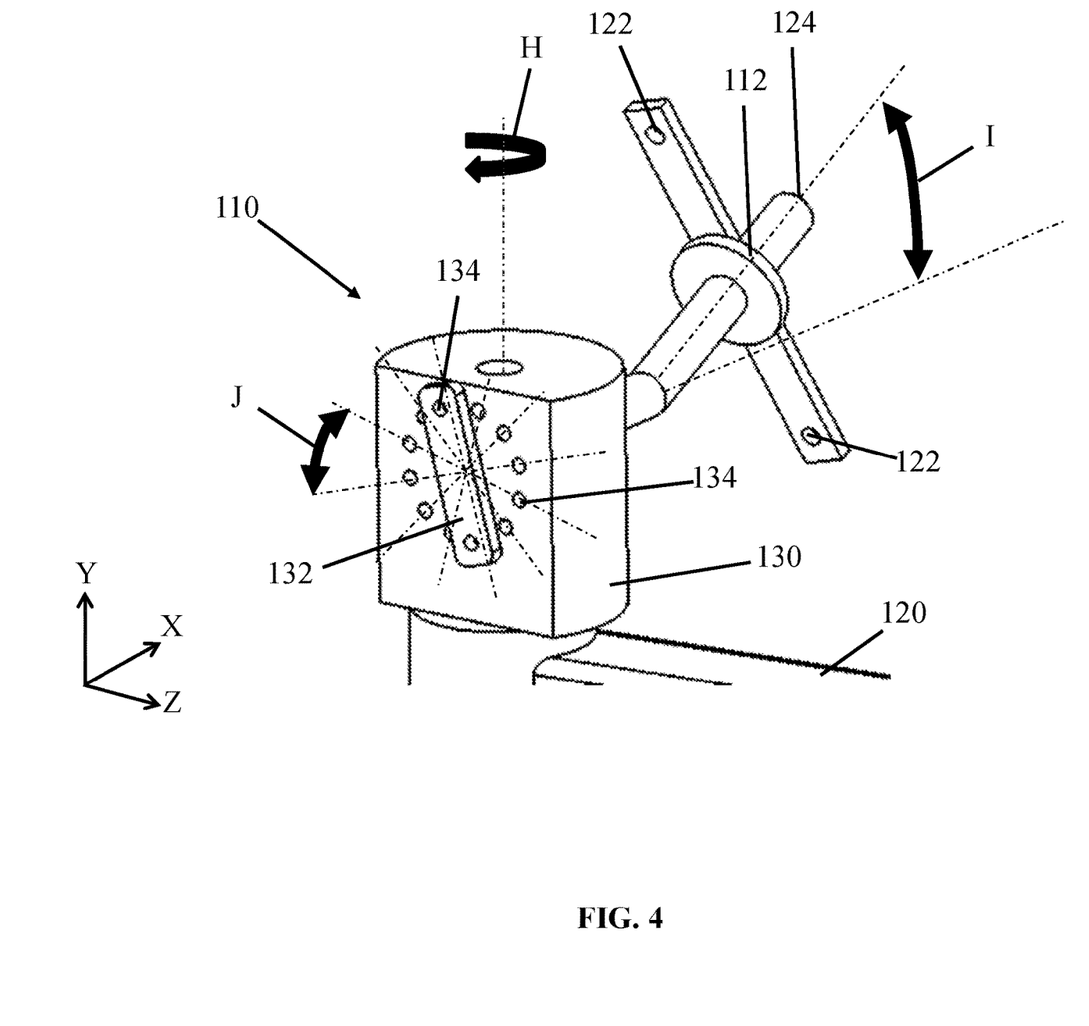
FIG. 4 is a perspective view of a rotatable bracket according to an embodiment of the present disclosure.

Referring to FIG. 4, an embodiment of bracket 110 is shown in detail. Bracket 110 can project from suspended bracket member 120 of apparatus 102 (FIG. 3). Bracket 110 can removably attach combustor 8 (FIG. 2) to apparatus 102 in any direction and in each embodiment discussed herein. Bracket 110 may be rotatably adjusted along the direction of arrow J to be positioned in different angular orientations as discussed elsewhere herein. In addition, bracket 110 can rotate combustor 8 (FIG. 2) attached thereto about its centerline axis A (FIG. 2). Additionally or alternatively, bracket 110 can include a forward end flange 122 for coupling to a similarly shaped end flange or other component (not shown) of combustor 8 (FIG. 2). An aligner 124 may also be coupled to apparatus 102, e.g., on bracket 110, allowing a user of apparatus 102 to align bracket 110 with combustor 8 (FIG. 2). Generally, aligner 124 may be a fixture visually indicating a direction of angular alignment for bracket 110, and/or may include a measuring device such as an optical measuring device, a mechanical measuring device, an angular measuring device, or similar apparatus used to indicate an orientation or position. Aligner 124 can indicate a path of alignment between apparatus 102 and combustor 8 (FIG. 2).

Bracket 110 can include a bracket body 130, to which other components of bracket 110 can be connected. Bracket body 130 can be rotatably attached to suspended bracket member 120, allowing bracket 110 to rotate along arrow J to various orientations. Rotatable member 112, designed to removably attach combustor 8 (FIG. 2), can project from bracket body 130 at an angle I relative to at least one axis, e.g., axis Z. Rotatable member 112 can extend partially or completely through bracket body 130 and terminate at a bracket lock 132. Bracket lock 132 can be rotated to different orientations along the direction of arrow J, examples of which are designated in FIG. 4 by phantom lines. Bracket lock 132 can be locked into place at a chosen location via inserting a bolt or pin (not shown) through locking mechanisms 134. As demonstrated by example in FIG. 4, locking mechanisms 134 can be in the form of holes configured to accept a locking component (not shown) such as a bolt or pin, thereby preventing further rotation. As a result, the orientation of rotatable member 132 can be further customized by using locking mechanisms 134 to hold rotatable member 112 at a particular position.

Figure 5:
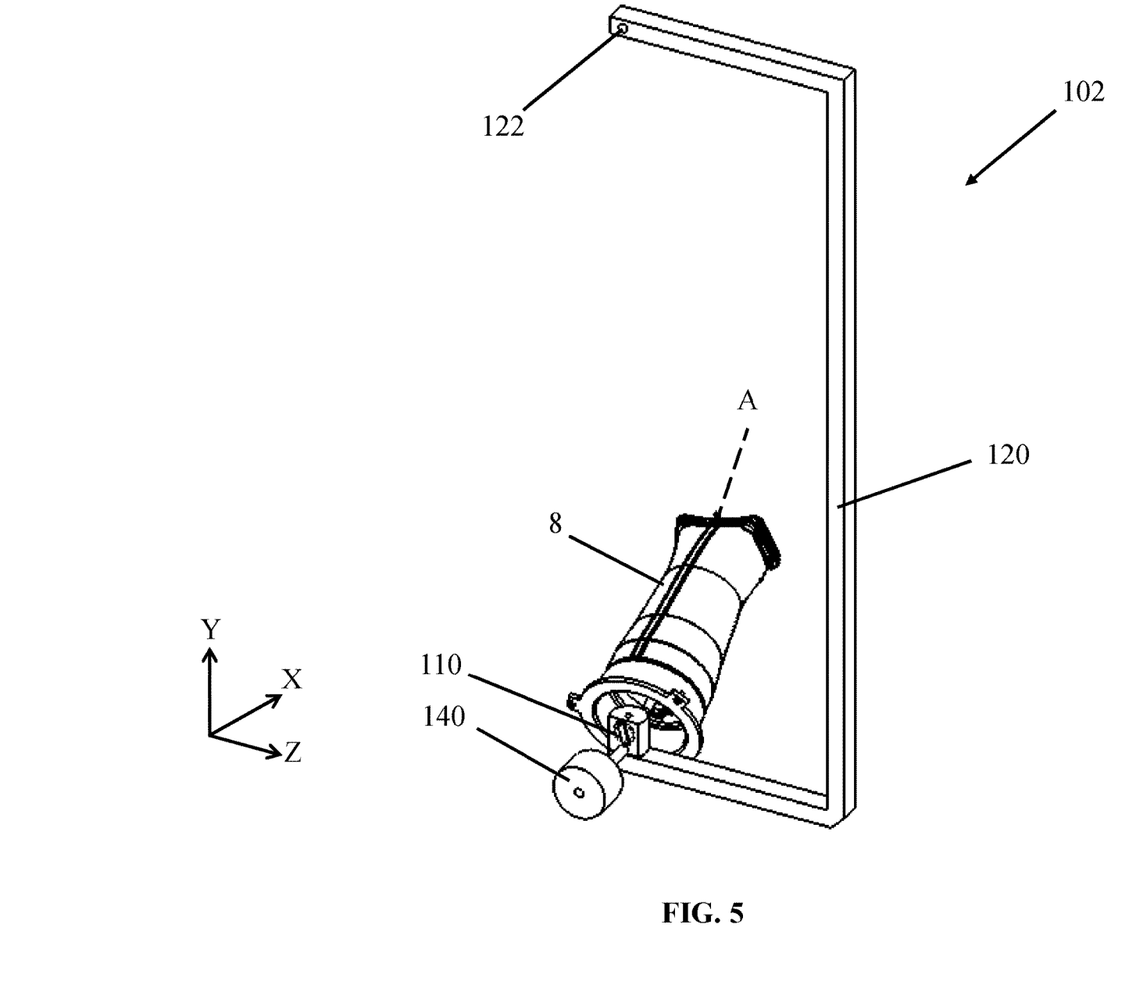
FIG. 5 is a perspective view of a suspended bracket member being used to manipulate a combustor according to an embodiment of the present disclosure.

Referring to FIGS. 4 and 5 together, an embodiment of apparatus 102 (FIG. 5 only) being used to manipulate combustor 8 (FIG. 5 only), e.g., for installation or removal, is shown. Rotatable member 112 (FIG. 4 only) can be coupled to bracket 110 and project therefrom. Rotatable member 112 can be rotated along the direction of arrow J to be oriented in various rotational positions, and can be locked into place with bracket lock 132 (FIG. 4 only) and locking mechanism 134 or any similar mechanisms currently known or later developed. Rotatable member 112 can thus be rotated along the direction of arrow J to reach various angular orientations. To accommodate combustors 8 of varying size, a counterweight 140 (FIG. 5 only) can be affixed to bracket 110, and may allow apparatus 102 to support weights of up to, e.g., one thousand kilograms. It is understood that bracket 110 and rotatable member 112 can support even greater weights by using different types of counterweights 140. Counterweights 140 can be composed of, e.g., lead, sand, water, or other substances capable of balancing the weight of combustor 8 to increase stability and control.

During use, combustor 8 (FIG. 5 only) can be coupled to bracket 110 of suspended bracket member 120. Counterweight 140 (FIG. 5 only) can be affixed to an opposite or offsetting area of suspended bracket member 120 to balance the load and increase control over combustor 8 as it moves. If desired, counterweight 140 may be affixed to suspended bracket member 120 at approximately the same time as the coupling of combustor 8 to bracket 110 (FIG. 4 only). In addition, counterweight 140 can be removed from suspended bracket member 120 after combustor 8 has been removed from bracket 110. In an embodiment, combustor 8 can be configured for use with components of complex turbomachines, e.g., a combustor T1 (FIG. 1) with one or more fuel nozzle assemblies T2 (FIG. 1). Rotatable member 112 (FIG. 4 only) can also rotate combustor 8 about its axial centerline axis A, distinct from casing centerline axis C (FIG. 2), allowing combustor 8 to be rotatably adjusted during manipulation.

Figure 6:
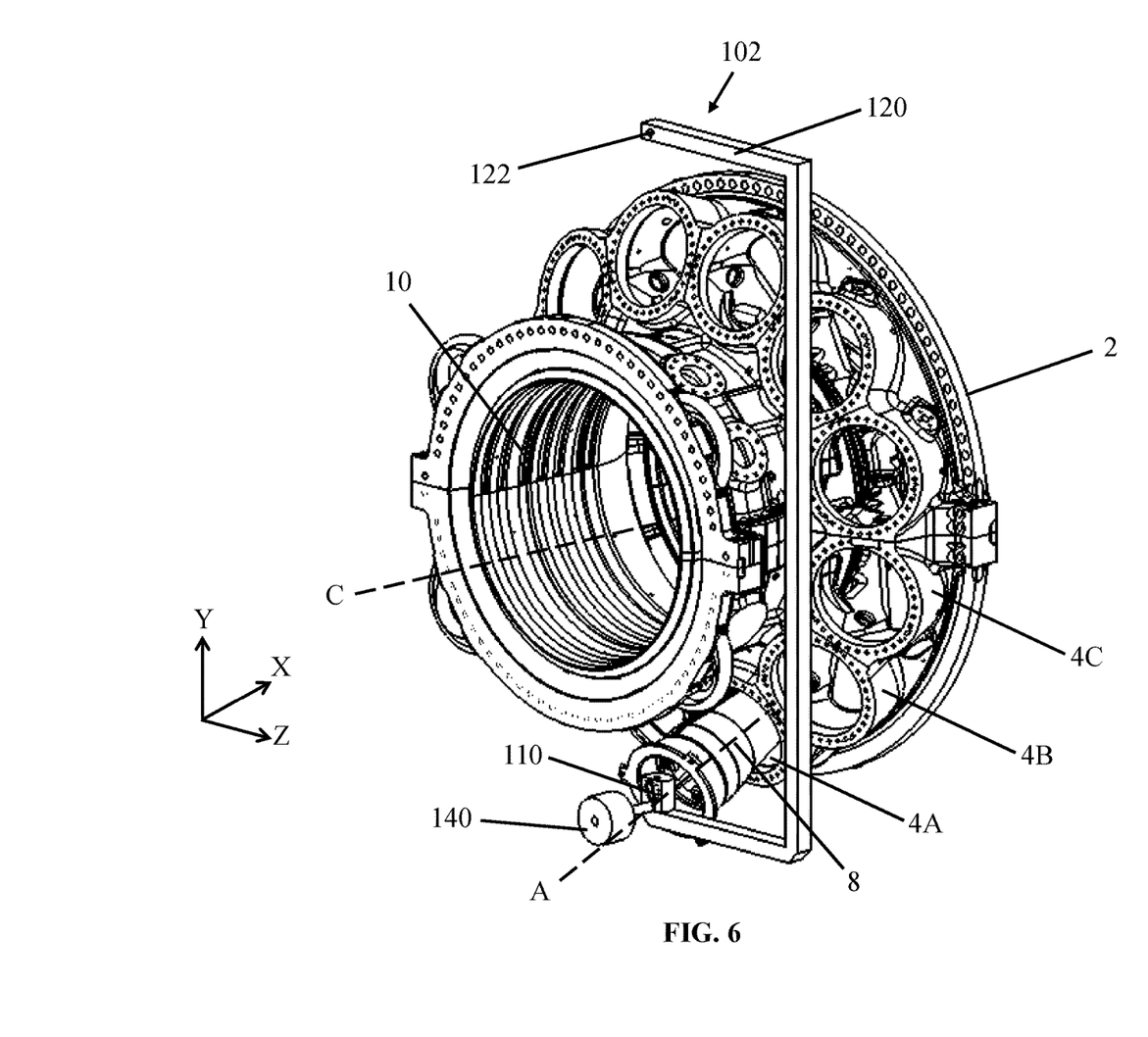
FIG. 6 is a perspective view of a suspended bracket member being used in a method according to an embodiment of the present disclosure.

As shown in FIG. 6, apparatus 102 can be used in a method according to the present disclosure. Bracket 110 can be substantially aligned with and moved to combustor attachment point(s) 4A, 4B, 4C through movement of suspended bracket member 120. Combustor 8 can be suspended from above with apparatus 102, and coupled to either bracket 110 or combustor attachment point(s) 4A, 4B, 4C to position combustor 8. As a result, apparatus 102 can position combustor 8 at points that would normally be inaccessible to a simple crane or other conventional overhead device. It is understood that terminus 122, during the positioning of combustor 8, is connected to an overhead crane, hoist, or other lift device used to move suspended bracket member 120. However, this connection is omitted in FIG. 6 for the purposes of clarity, and similar connections are discussed elsewhere herein or shown in other illustrations (e.g., FIGS. 9, 10) where applicable.

Figure 7:
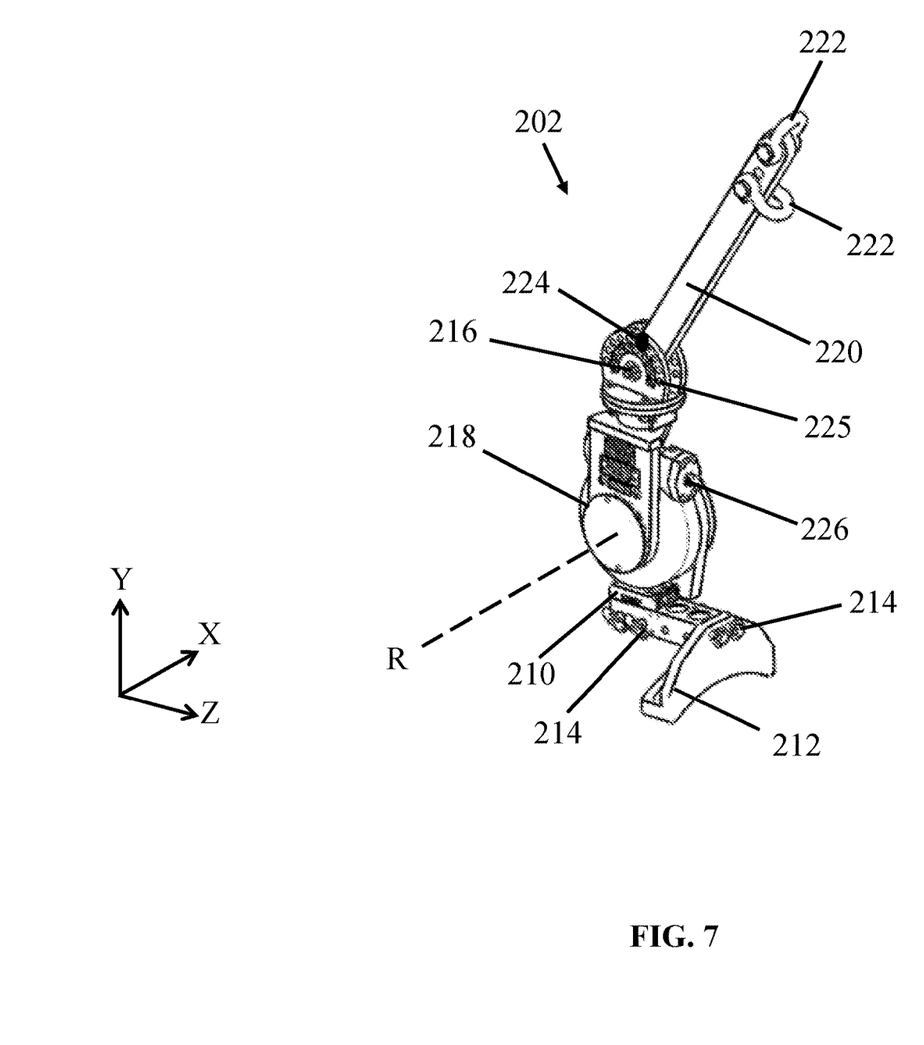
FIG. 7 is a perspective view of an apparatus according to embodiments of the present disclosure.

Turning to FIG. 7, an apparatus 202 according to embodiments of the present disclosure is shown. Embodiments of apparatus 202 can be used separately from and/or combined with features of apparatus 102 shown in FIGS. 3-6 and described in detail elsewhere herein. Apparatus 202 can include a bracket body 210 including an operative head 212 configured to removably attach turbomachine combustor 8 (FIGS. 2, 5-6). Operative head 212 can be structurally integrated with the remainder of bracket body 210, or in alternative embodiments, may be a modular component configured for coupling to a specific portion, surface, region, etc., of turbomachine combustor 8. In an example embodiment, operative head 212 can be adjoined to bracket body 210 through fasteners 214 in the form of bolts, but other currently-known or later-developed mechanical fasteners are contemplated in alternative embodiments. Operative head 212 can similarly be embodied as a fixed component for removably attaching combustors 8, and/or may include separate fasteners, joints, connectors, etc., for coupling to corresponding features of combustor 8. In addition to static couplings, operative head 212 may be connected to bracket body 210 through, e.g., dovetails, magnetic contact, mechanically adjustable gears, rotatable couplings, and other forms of coupling capable of allowing one component to move relative to another, whether currently known or later developed.

Apparatus 202 can further include a rotatable joint 216 coupled to bracket body 210 through a gear bearing 218, such that gear bearing 218 can rotate bracket body 210 relative to rotatable joint 216. Rotatable joint 216, in turn, can be rotatably coupled to a suspended member 220 extending between rotatable joint 216 and a suspension device 222. Suspended member 220 can be coupled to suspension device 222 at one end, while being coupled to rotatable joint 216 at its opposing end. Suspension device 222 can be embodied as, e.g., a loop, fastener, and/or other mechanical component configured for attachment to a suspension tool (e.g., an overhead crane).

Embodiments of the present disclosure can provide an apparatus 202 for installing or removing combustors 8 (FIG. 2). In particular, embodiments of apparatus 202 are operable to install and remove combustors 8 for casings 2 (FIG. 2) in which combustor attachment points 4 (FIG. 2) are oriented at a non-parallel angle (i.e., along axis A (FIG. 2)) relative to centerline axis C (FIG. 2). Embodiments of the present disclosure can safely and efficiently install and remove combustor 8 with a mass of, for example, up to approximately one thousand kilograms. One or more components of apparatus 202 can be composed of a material capable of supporting large masses and components, e.g., structural steel. Components of apparatus 202 discussed herein can and also include various lifts, drive mechanisms, rails, bolts, brackets, etc. made from similar or stronger materials to support the mass and weight of the equipment being positioned. Apparatus 202 can include other structural components designed to removably attach and move combustor(s) 8, while avoiding contact between apparatus 202 and flow path 10 (FIG. 2).

Rotatable joint 216 may be mechanically coupled to suspended member 220 through a pin 224 adapted to extend through rotatable joint 216 and suspended member 220. Pin 224 may be removable from apparatus 202, such that suspended member 220 and rotatable joint 216 may be rotated relative to each other into a predetermined angular alignment. Pin 224 can be inserted through one of a plurality of apertures 225 of rotatable joint 216, and a corresponding aperture (not shown) within suspended member 220, at the predetermined angular alignment before apparatus 202 is used. In this manner, suspended member 220 can be reoriented such that operative head 212 and other components for installing and removing combustors 8 may operate without contacting casing 2 (FIG. 2), e.g., near flow path 10 (FIG. 2).

Figure 8:
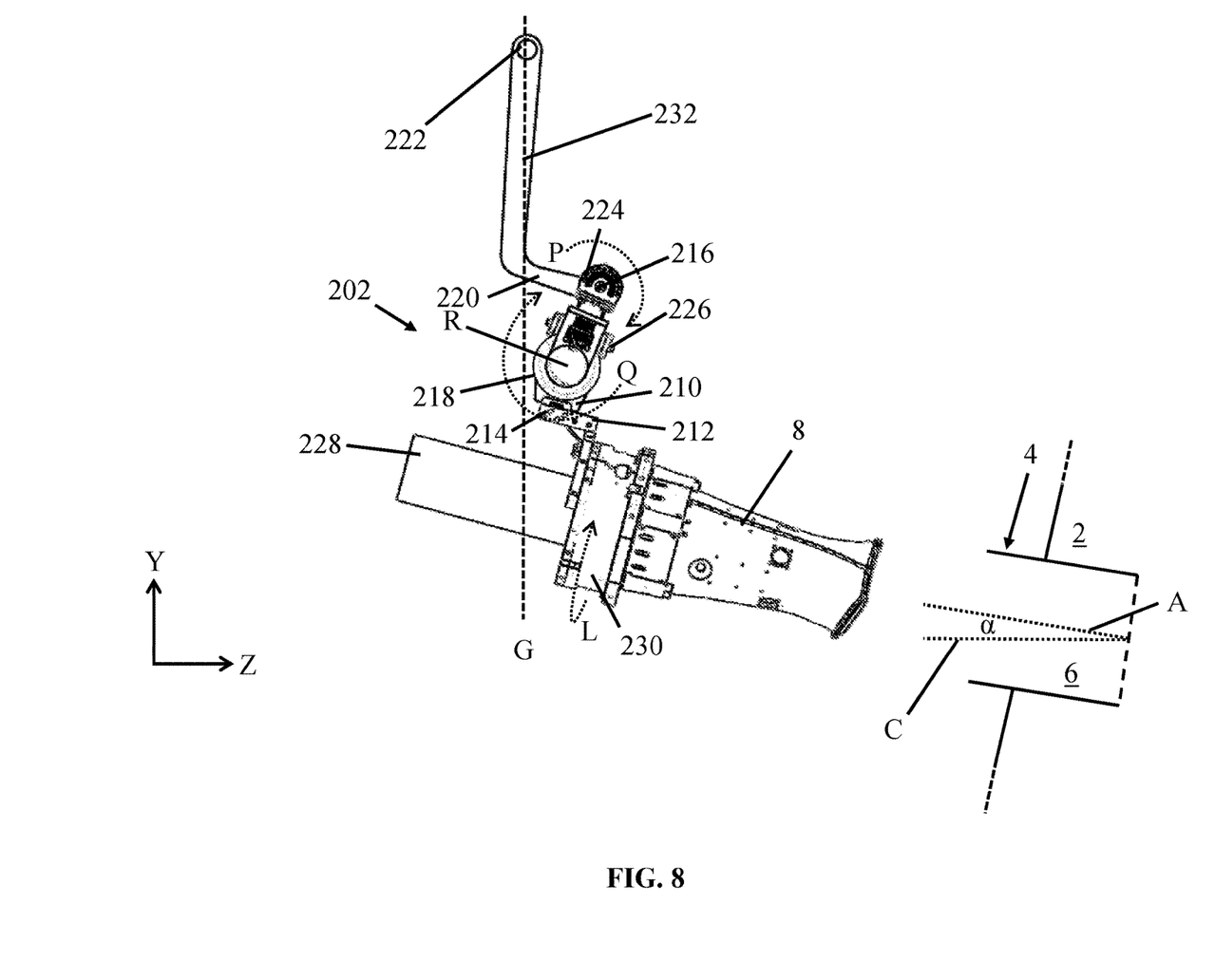
FIG. 8 is a side view of an apparatus according to embodiments of the present disclosure.

Degrees of movement for components of apparatus 202 are shown in further detail in FIG. 8. Rotatable joint 216 can provide one axis for rotating elements of apparatus 202 relative to each other, e.g., by allowing gear bearing 218 to be rotated relative to suspended member 220 along the direction of arrow P. In addition to this axis of rotation, gear bearing 218 of apparatus 202 can provide a second and distinct axis of rotation for positioning bracket body 210 relative to rotatable joint 216 and gear bearing 218. Adjusting rotatable joint 216 (e.g., by moving pin 224 to a different apertures 225) can define the position of an axis of rotation R for gear bearing 218. At any selected position, gear bearing 218 can be centered about axis of rotation R at a corresponding location, and in any rotational direction along reference arrow Q. Thus, a user may adjust apparatus 202 to reposition axis of rotation R by adjusting the alignment between suspended member 220 and rotatable joint 216, in order to move bracket body 210 along direction Q about the selected position of reference axis R.

Apparatus 202 can be configured to permit two forms of rotation, e.g., rotation of suspended member 220 relative to rotatable joint 216 along line P, and rotation of bracket body 210 relative to gear bearing 218 along line Q. Through these forms of movement, rotatable joint 216 and gear bearing 218 can be adjusted independently to define a center of gravity of apparatus 202, denoted by reference line G. The "center of gravity," also known as a "mass centroid" or "center of mass," generally refers to the point from which the total weight of an object or assembly of objects may be considered to act in a downward direction. The center of gravity for a mass system such as apparatus 202 may be positioned within or outside the system, depending on the relative position of objects therein and their weight distribution. By adjusting rotatable joint 216 and gear bearing 218, a user may affect the weight distribution of apparatus 202 by adjusting the relative positions of bracket body 210, rotatable joint 216, gear bearing 218, and suspended member 220. These changes in weight distribution can allow a user to adjust center of gravity G for apparatus 202 into a desired position before installing or removing combustors 8. Where center of gravity G extends directly downward from suspension device 222 with a zero net torque, apparatus 202 may be considered to be in static equilibrium. Thus, embodiments of the present disclosure are operable to manipulate the position of center of gravity G to maintain static equilibrium, e.g., by adjusting rotatable joint 216 and/or gear bearing 218.

Gear bearing 218 can include or otherwise be coupled to a drive mechanism 226 for transmitting mechanical power to gear bearing 218. Drive mechanism 226 can include or be embodied as, e.g., one or more of, e.g., a pneumatic drive system, an electromechanical motor, a hydraulic drive system, etc. Regardless of the applicable embodiment, drive mechanism 226 can convert various types of power (e.g., fuels, electricity, etc.) into mechanical energy for actuating gear bearing 218 and thereby adjusting the relative alignment between bracket body 210 and gear bearing 218. The structure of gear bearing 218 can be appropriately sized to house the components of drive mechanism 226 (e.g., a spring-based mechanical transmission or other purely mechanical system without electrical, pneumatic and/or hydraulic elements). In other embodiments, drive mechanism 226 of gear bearing 218 can include an electric motor, hydraulic motor, pneumatic motor, manual geared screw adjustment, etc. It is also understood that drive mechanism 226 can be configured to adjust the position of bracket body 210 relative to gear bearing 218 by incremental amounts. For example, gear bearing 218 may include a gearing surface or similar mechanism configured to provide incremented angular adjustments of bracket body 210 relative to hear bearing 218. Gear bearing 218 thus may be structured such that movement along reference arrow Q about axis of rotation R is subdivided into discrete angular adjustments of, e.g., one degree, but it is understood that any desired form of incremental angular adjustment may be provided by incorporating different types of gear bearings 218 within apparatus 202. Drive mechanism 226 can be directly or indirectly mechanically coupled to gear bearing 218 to permit rotation of bracket body 210 relative to gear bearing 218. In any event, drive mechanism 226 may be configured to rotate bracket body 210 about gear bearing 216 and axis of rotation R in any direction along reference arrow Q.

Bracket body 210 can include operative head 212 in the form of, e.g., any bracket or other component described herein operable to attach, install, remove, and/or perform other positioning operations on, combustor(s) 8 (FIGS. 2, 5-6). Other components of apparatus 202 (e.g., rotatable joint 216, gear bearing 218, etc.) can substantially align bracket body 210 and/or operative head 212 with combustor attachment points oriented at a non-parallel angle (e.g., along axis A) relative to centerline axis C of casing 2. As used herein, the term "substantial alignment" or "substantially aligned" can refer to any alignment by which operative head 212 can be moved linearly (e.g., within Z-Y plane) to reach combustor attachment point(s) 4. Operative head 212 can become substantially aligned with combustor attachment point(s) 4 by adjusting rotatable joint 216 and/or gear bearing 218. The various components of 202 discussed elsewhere herein, can permit rotatable joint 216 to reach a selected height and a selected angle relative to at least one axis, e.g., axis Z. A user of apparatus 202 can then move bracket body 210 (e.g., by way of an overhead crane or other support system for apparatus 202) combustor attachment point(s) 4. After operative head 212 is substantially aligned with combustor attachment point(s) 4, operative head 212 can be moved along to combustor attachment point 4 to install or remove combustor(s) 8.

To provide mechanical balance against the total mass of operative head 212, which may be concentrated at one size of apparatus 202 along axis Z, a counterweight 228 can be coupled to operative head 212 to yield a zero torque and/or maintain static equilibrium of apparatus 202 during use. Counterweight(s) 228 can thus also be added to, removed from, and/or adjusted within apparatus 202 to maintain the position of center of gravity G as extending from suspension device 222. In alternative embodiments, counterweight 228 may be connected to other components of apparatus 202 other than operative head 212. Counterweight 228 can be embodied as a modular component adapted for use with particular bracket bodies 210 and/or operative heads 212, and may be coupled to operative head 212 before apparatus 202 is used to perform methods according to the present disclosure.

Operative head 212 may include, e.g., a rotatable support bracket 230 shaped to engage a complementary surface of combustor(s) 8. In the example of FIG. 8, rotatable support bracket 230 can be shaped to engage an interior circumferential surface combustor(s) 8, e.g., at its body end, while rotatable support bracket 230 can be shaped to engage, e.g., an axial end, an outer circumferential surface, etc., of combustor(s) 8 in other embodiments. Rotatable support bracket 230 of operative head 212 may be rotatably coupled to bracket body 210 (e.g., through a pivot connection, hinge, etc.,) such that rotatable support bracket 230 of operative head 212 can be rotated substantially along the direction of reference arrow L. In this manner, rotatable support bracket 230 may be operable to install and remove turbomachine combustors 8 designed for attachment to combustor attachment points 4 through threaded fasteners or other rotation-based mechanical connections. In any event, embodiments of apparatus 202 can include one of a plurality of operative heads 212 and/or rotatable support bracket(s) 230, each of which can be shaped to engage a different portion of turbomachine combustor(s) 8. Examples of alternative operative heads 212 and/or rotatable support brackets 230 are described elsewhere herein and shown by example in FIGS. 9-10. In addition, it is understood that embodiments of bracket 110 (FIGS. 3-6) and/or other forms of rotatable and non-rotatable mechanical couplings can be used with operative head 212 and/or instead of rotatable support bracket 230. In some cases, suspended member 220 can include or be embodied as a non-linear member 232 shaped to wrap around an exterior surface profile of casing 2, such that apparatus 202 does not contact casing 2 during use. Non-linear member 232 can be provided in the form of, e.g., one or more curvilinear members, a plurality of linearly-oriented members coupled together (e.g., in a substantially C-shaped profile, L-shaped profile, J-shaped profile, etc.) to provide a non-linear geometry. Non-linear member 232 is shown by example to be a single curvilinear member.

Figure 9:
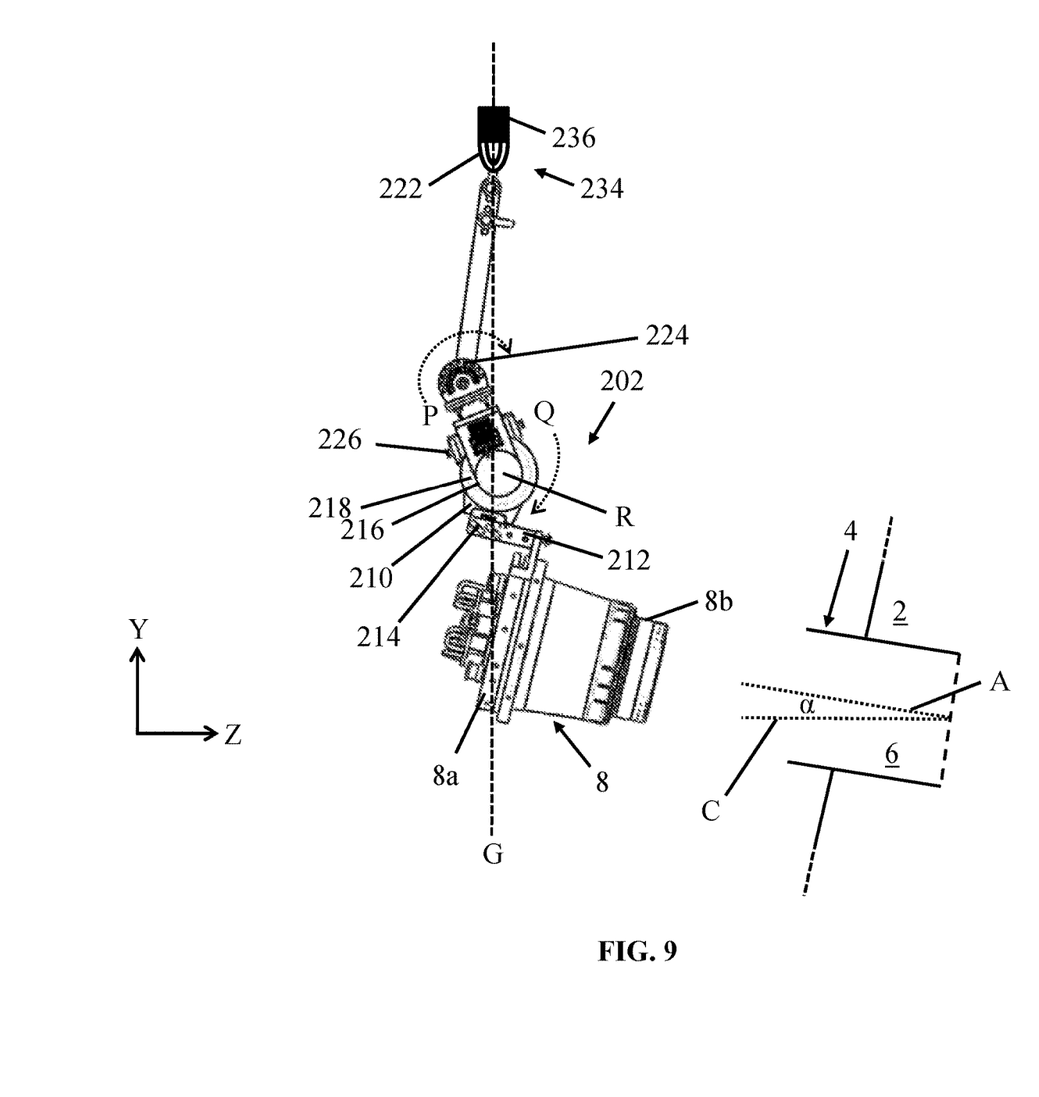
FIG. 9 is a side view of a method for manipulating a turbomachine combustor according to embodiments of the present disclosure.

Turning to FIG. 9, another embodiment of apparatus 202 is shown to demonstrate methods according to the present disclosure. In the example of FIG. 9, apparatus 202 is shown in a method for installing of combustor 8, but it is understood that variants of the methods described herein can also be used and/or adapted for removing combustor(s) 8. Combustor 8 can include a body end 8a and a head end 8b. Operative head 212 of apparatus 202 can be configured to removably attach body end 8a of combustor 8, which in turn may be designed to define an external axial end of combustor 8 when installed within casing 2 (FIG. 2). Methods according to the present disclosure can include suspending rotatable joint 216 from suspended member 220, with suspended member 220 being coupled to a suspension joint 234 to an overhead device 236 (e.g., a crane, suspension transport system, rail transport machine, or similar system positioned above apparatus 202).

Suspended member 220 may be mechanically coupled to suspension joint 234, e.g., through suspension device 222 (e.g., a hook). Suspension joint 234 can thereby be positioned above apparatus 202 (e.g., along Y-axis) such that rotatable joint 216 is rotatably coupled to bracket body 210 through gear bearing 218 as described elsewhere herein. Bracket body 210 can also be configured to removably attach a corresponding surface or portion (e.g., outer circumferential surface as depicted in FIG. 9) of combustor 8 through operative head 212. Center of gravity G is shown to extend downward from suspension device 222, e.g., because rotatable joint 216 and gear bearing 218 are in specific positions while non-linear member 232 may have a greater mass concentration than other components of apparatus 202.

Figure 10:
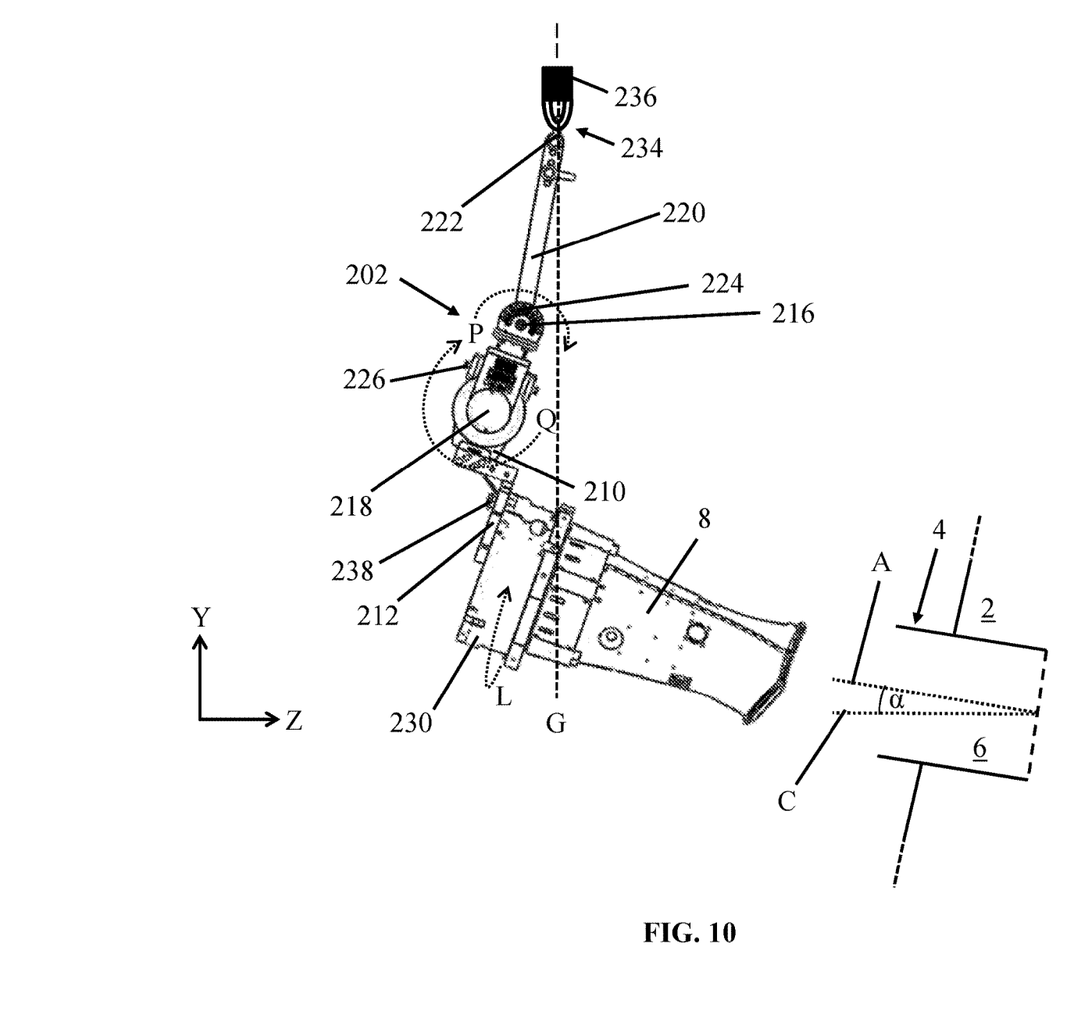
FIG. 10 is a side view of a method for manipulating a turbomachine combustor according to further embodiments of the present disclosure.

A simplified view of casing 2 with combustor attachment point 4 and hollow interior 6 is shown in FIGS. 9-10 to further demonstrate methods according to the present disclosure. Combustor attachment point 4 can be oriented along a centerline A angularly displaced from centerline axis C of casing 2, such that an angular differential a causes combustor attachment point 4 to be oriented along a non-parallel angle relative to centerline axis A. To prepare operative head 212 for manipulation of combustor(s) 8, embodiments of the present disclosure can include rotating rotatable joint 216 relative to suspended member 220 such that gear bearing 218 is centered about a predetermined axis of rotation R. For example, pin 224 can be positioned within a particular aperture 225 of rotatable joint 216 to move suspended member 220, e.g., along reference arrow P. Adjusting rotatable joint 216 can define an angular displacement between suspended member 220 and other components of apparatus 202.

After adjusting rotatable joint 216 to determine the position of axis of rotation R, embodiments of the present disclosure can include rotating bracket body 210 relative to rotatable joint 216 and about axis of rotation R, through gear bearing 218. Rotating bracket body 210 through gear bearing 218, e.g., along reference arrow Q, can define an orientation of bracket body 210, operative head 212, and/or combustor 8 relative to other components (e.g., casing 2 and combustor attachment point(s) 4). In addition, as described elsewhere herein, independently adjusting rotatable joint 216 and gear bearing 218 can manipulate the position of center of gravity G, such that a user of apparatus 202 can move center of gravity G to a position which maintains static equilibrium of apparatus 202 (e.g., extending through suspension device 222).

As shown in FIG. 10, gear bearing 218 can rotate bracket body 210 and operative head 212 to substantially align combustor 8 with combustor attachment point 4. Substantial alignment of combustor 8 with combustor attachment point 4 can include, e.g., causing a centerline axis of combustor 8 to become substantially coincident with the angular orientation of combustor attachment point 4 (designated, e.g., by axis A). Embodiments of the present disclosure can include actuating drive mechanism 226 of gear bearing 218 to rotate bracket body 210 into one of a plurality of predetermined and/or incremental rotational positions about axis of rotation R, causing substantial alignment between bracket body 210 and combustor attachment point 4. Thereafter, operative head 212 can be brought into contact combustor attachment point 4 without contacting apparatus 202 with casing 2, and then coupling combustor 8 to operative head 212 (e.g., for removal) or combustor attachment point 4 (e.g., for installation) of casing 2. Such contact may be provided, e.g., by moving suspension device 236 along the direction of axis A to linearly bring operative head 212 into or out of contact with combustor attachment point 4.

Methods according to the present disclosure can additionally include further adjustment of apparatus 202 before installing or removing combustor(s) 8 by way of operative head 212. For example, as described elsewhere herein, operative head 212 can include or be connected to rotatable support bracket 230, e.g., through a rotatable coupling 238 positioned axially between combustor 8 and rotatable support bracket 230. Rotatable coupling 238 can permit rotation of combustor 8 along the direction of reference arrow L to facilitate movement where combustors 8 connect to hollow interior 6 through a threaded fastening or similar mechanical connection. When operative head 212 is substantially aligned with combustor attachment point 4, rotatable coupling 238 can allow rotatable support bracket 230 to rotate substantially about axis A denoting the angular orientation of combustor attachment point 4. In alternative embodiments, operative head 212 or support bracket 230 may be substituted for one of a plurality of alternative operative heads 212 or support brackets 230 (e.g., shown in FIGS. 7-9) for connecting to respective types of combustors 8 and/or respective portions of a single combustor 8.

The various embodiments discussed in this disclosure can offer several technical and commercial advantages. For example, embodiments of the present disclosure can provide the ability to position (e.g., install or remove) relatively large and heavy combustors configured for use in a region beneath a flow path of a turbomachine assembly, and/or other areas otherwise inaccessible to conventional mechanical equipment (e.g., cranes). Another advantage realized from embodiments of the present disclosure can include the ability to safely position heavy gas turbine combustors, which as an example may have a mass of up to, for example, approximately one thousand kilograms. An additional advantage may include the ability to move and position gas turbine combustors in combustor attachment points oriented at a non-parallel angle relative to the centerline axis of a casing, but without causing a collision between apparatuses according to the present disclosure and the casing structure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

This written description uses examples to describe embodiments of the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for manipulating a turbomachine combustor configured for installation at a combustor attachment point of a turbomachine casing, the method comprising:
   suspending a rotatable joint from a suspended member, such that the suspended member is mechanically coupled to a suspension joint positioned above the combustor attachment point, wherein the rotatable joint is rotatably coupled to a bracket body through a gear bearing, the bracket body being configured to removably attach the turbomachine combustor at an operative head of the bracket body;
   rotating the rotatable joint relative to the suspended member such that the gear bearing is centered about a predetermined axis of rotation;
   rotating the bracket body about the predetermined axis of rotation and the rotatable joint to a static equilibrium position, through the gear bearing, such that the operative head of the bracket body is substantially aligned with the combustor attachment point of the turbomachine casing;
   contacting the combustor attachment point with the operative head of the bracket body, without contacting the turbomachine casing with the suspended member; and
   coupling the turbomachine combustor to one of the operative head of the bracket body or the combustor attachment point of the turbomachine casing.

2. The method of claim 1, further comprising rotating a rotatable support bracket of the operative head about a centerline axis thereof, such that the rotatable support bracket is oriented substantially coaxially with the turbomachine combustor, before contacting the combustor attachment point with the operative head.

3. The method of claim 1, wherein the gear bearing is configured to provide a plurality of incremental angular adjustments of the bracket body relative to the rotatable joint.

4. The method of claim 1, wherein the suspended member comprises a non-linear member having a suspension device coupled to the suspension joint at a first end thereof, and wherein a second end of the non-linear member is rotatably coupled to the rotatable joint.

5. The method of claim 1, further comprising coupling a counterweight to one of the bracket body or the suspended member, before the contacting of the combustor attachment point with the bracket body.

6. The method of claim 1, wherein the operative head of the bracket body is shaped to engage a complementary surface of the turbomachine combustor.

7. The method of claim 1, further comprising coupling a selected one of a plurality of operative heads to the bracket body, each of the plurality of operative heads being shaped to engage a respective portion of the turbomachine combustor, before contacting the combustor attachment point with the operative head of the bracket body.

8. The method of claim 7, wherein the selected one of the plurality of operative heads is shaped to engage one of an outer circumferential surface of a head end of the turbomachine combustor, or an interior circumferential surface of a body end of the turbomachine combustor.

9. The method of claim 1, wherein the rotating of the bracket body about the rotatable joint further includes actuating a drive mechanism to rotate the bracket body into one of a plurality of predetermined rotational positions about the predetermined axis of rotation.

10. An apparatus for installing and manipulating a turbomachine combustor configured for installation in a turbomachine casing, the apparatus comprising:
a bracket body including an operative head configured to removably attach a turbomachine combustor;
a rotatable joint rotatably coupled to the bracket body through a gear bearing, wherein the gear bearing is configured to rotate the bracket body relative to the rotatable joint; and
a suspended member rotatably coupled to the rotatable joint at a first end, and coupled to a suspension joint at a second end, wherein the rotatable joint rotates the gear bearing and the bracket body relative to the suspended member to center the gear bearing about a predetermined axis of rotation, and wherein an axis extending from the suspension joint to the operative head of the bracket body defines a center of gravity of the apparatus.

11. The apparatus of claim 10, wherein the operative head of the bracket body is further configured to removably attach the turbomachine combustor at one of an outer circumferential surface of a head end of the turbomachine combustor or an interior circumferential surface of a body end of the turbomachine combustor.

12. The apparatus of claim 10, wherein the operative head of the bracket body is shaped to engage a complementary surface of the turbomachine combustor.

13. The apparatus of claim 10, wherein the suspended member comprises a non-linear member shaped to wrap around an exterior surface profile of the turbomachine casing.

14. The apparatus of claim 10, wherein the gear bearing is operably coupled to a drive mechanism configured to rotate the bracket body into one of a plurality of incremental rotational positions relative to the rotatable joint, and about the predetermined axis of rotation.

15. The apparatus of claim 10, wherein the gear bearing is configured to provide a plurality of incremental angular adjustments of the bracket body relative to the rotatable joint.

16. An apparatus for manipulating a turbomachine combustor configured for use with a turbomachine casing, the apparatus comprising:
a bracket body including an operative head configured to removably attach a turbomachine combustor, wherein the operative head is shaped to engage a complementary surface of the turbomachine combustor;
a rotatable joint rotatably coupled to the bracket body through a gear bearing, wherein the gear bearing is configured to rotate the bracket body relative to the rotatable joint; and
a suspended member rotatably coupled to the rotatable joint at a first end, and coupled to a suspension joint at a second end, the suspension joint being positioned above the turbomachine casing, wherein the rotatable joint rotates the gear bearing and the bracket body relative to the suspended member to center the gear bearing about a predetermined axis of rotation, and wherein an axis extending from the suspension joint to the operative head of the rotatable bracket defines a center of gravity of the assembly.

17. The apparatus of claim 16, wherein the suspended member comprises a non-linear member shaped to wrap around an exterior surface profile of the turbomachine casing.

18. The apparatus of claim 16, wherein the gear bearing is operably coupled to a drive mechanism configured to rotate the bracket body into one of a plurality of incremental rotational positions relative to the rotatable joint, and about the predetermined axis of rotation.

19. The apparatus of claim 16, wherein the gear bearing is configured to provide a plurality of incremental angular adjustments of the bracket body relative to the rotatable joint.

* * * * *